United States Patent
Ihara et al.

(10) Patent No.: US 7,393,470 B2
(45) Date of Patent: Jul. 1, 2008

(54) PROCESS FOR PRODUCING SYNTHESIS GAS FOR THE FISCHER-TROPSCH SYNTHESIS AND PRODUCING APPARATUS THEREOF

(75) Inventors: Masaru Ihara, Funabashi (JP); Yoshifumi Suehiro, Horie Urayasu (JP); Yasumasa Morita, Tokyo (JP); Kiyoshi Inaba, Ichikawa (JP); Toshio Shimizu, Satte (JP); Osamu Iwamoto, Satte (JP); Tomoyuki Mikuriya, Tokyo (JP); Ryuichiro Kajiyama, Yokohama (JP); Ken-ichiro Fujimoto, Tokyo (JP); Yasuhiro Onishi, Tokyo (JP)

(73) Assignees: Japan Oil, Gas and Metals National Corporation, Kanagawa-ken (JP); Sekiyushigen Kamatsu Kabushiki Kaisha, Tokyo (JP); Cosmo Oil Co. Ltd., Tokyo (JP); Chiyoda Corporation, Kanagawa-ken (JP); Nippon Steel Corporation, Tokyo (JP); Inpex Corporation, Tokyo (JP)

( * ) Notice: Subject to any disclaimer, the term of this patent is extended or adjusted under 35 U.S.C. 154(b) by 330 days.

(21) Appl. No.: 11/090,393

(22) Filed: Mar. 25, 2005

(65) Prior Publication Data

US 2005/0220703 A1    Oct. 6, 2005

(30) Foreign Application Priority Data

Mar. 30, 2004    (JP) ............................ 2004-100941

(51) Int. Cl.
    $C01B\ 3/26$    (2006.01)
(52) U.S. Cl. ..................................... 252/373
(58) Field of Classification Search ............ 252/373
    See application file for complete search history.

(56) References Cited

U.S. PATENT DOCUMENTS

| 5,104,419 | A * | 4/1992 | Funk ........................ 48/209 |
| 7,074,375 | B2 * | 7/2006 | Lampert et al. ....... 423/244.09 |
| 2002/0024038 | A1 * | 2/2002 | Iijima et al. ................ 252/373 |

* cited by examiner

Primary Examiner—Wayne A. Langel
(74) Attorney, Agent, or Firm—Kolisch Hartwell, P.C.

(57) ABSTRACT

Synthesis gas for FT synthesis is produced using a producing apparatus including an active carbon adsorbing vessel for adsorbing impurities in a natural gas, a hydro-desulfurizer for hydrogenating and desulfurizing sulfur content in the natural gas under a condition of a partial pressure of hydrogen of 100 to 200 kPa, a second hydrogen supplying line for supplying hydrogen to the natural gas between the hydro-desulfurizer and a reactor, the reactor for obtaining synthesis gas by reacting the natural gas, carbon dioxide and steam in the presence of a catalyst for reforming, and a heat recovering boiler for cooling the synthesis gas at a cooling rate of 2000 to 4000° C./second.

6 Claims, 2 Drawing Sheets

PROCESS FOR PRODUCING SYNTHESIS GAS FOR THE FISCHER-TROPSCH SYNTHESIS AND PRODUCING APPARATUS THEREOF

BACKGROUND OF THE INVENTION

1. Field of the Invention

The present invention relates to a process for producing synthesis gas for the Fischer-Tropsch synthesis and a producing apparatus thereof.

Priority is claimed on Japanese Patent Application No. 2004-100941, filed Mar. 30, 2004, the content of which is incorporated herein by reference.

2. Description of Related Art

In recent years, the GTL technology (Gas to Liquids) for producing liquid fuel, such as light oil and kerosene, from natural gas has attracted attention. The GTL technology consists of a step of reforming gaseous hydrocarbons to the synthesis gas of hydrogen and carbon monoxide using a reforming catalyst, and a step of obtaining converted liquefied hydrocarbons from the synthesis gas by the Fischer-Tropsch synthesis (hereafter referred to as FT synthesis).

As a method for reforming hydrocarbons such as a natural gas to synthesis gas, Japanese Unexamined Patent Application, First Publications No. 2000-104078 and No. 2002-173303 respectively disclose a process for manufacturing synthesis gas having a hydrogen/carbon monoxide ratio which is suitable for the FT synthesis, including the steps of reforming hydrocarbons, carbon dioxide and steam in the presence of a reforming catalyst at a temperature of 800 to 1000° C.

In addition, these patent documents above disclose reforming catalysts which are suitable for manufacturing synthesis gas for the FT synthesis, conditions suitable for performing the reforming reaction such as molar ratio of (steam+carbon dioxide)/carbon atoms in the hydrocarbons, the reaction temperature, and the pressure, basic constitution of a manufacturing apparatus such as a hydro-desulfurizer, and a reactor in which catalyst tubes loaded with a catalyst for reforming are installed.

However, if an attempt is made to make the production equipment larger while actually using natural gas as a raw material, in order to perform the production of the synthesis gas for the FT synthesis commercially, the following new problems which are not present appear. That is, soot (microparticles of carbon) becomes mixed in the manufactured synthesis gas for the FT synthesis, thereby enormously deteriorating the quality of the synthesis gas for the FT synthesis. In addition, a side reaction occurs in the hydro-desulfurizer, elevating temperature rapidly, such that it becomes impossible to control the temperature. Moreover, the catalyst for reforming (inlet side of the catalyst tube) is oxidized, deteriorating the activity of the catalyst.

Therefore, an object of the present invention is to provide a process for producing the synthesis gas for FT synthesis and a producing apparatus therefor, which are capable of producing the synthesis gas for FT synthesis having hydrogen/carbon monoxide molar ratio suitable for FT synthesis (1.9-2.1) and no soot mixed therein, and which can suppress the side reaction in a hydro-desulfurizer and the deterioration of the catalyst for reforming, and which are applicable to a large scale production equipment (commercial plant).

SUMMARY OF THE INVENTION

The first aspect of the present invention is a process for producing synthesis gas for the Fischer-Tropsch synthesis including: an adsorbing step of adsorbing impurities contained in natural gas by an active carbon to remove the impurities therefrom; a hydro-desulfurizing step of hydrogenating sulfur content in the natural gas in the presence of a hydrogenation catalyst and desulfurizing the sulfur content by adsorbing agent; a hydrogen supplying step of supplying the natural gas after the hydro-desulfurizing step with hydrogen ($H_2$) in an amount of 0.05 to 0.1 mol to 1 mol of carbon (C) of hydrocarbon in the natural gas; a reaction step of reacting the natural gas, carbon dioxide, and steam in the presence of a catalyst for reforming to obtain synthesis gas for the Fischer-Tropsch synthesis; and a cooling step of cooling the synthesis gas for the Fischer-Tropsch synthesis at a cooling rate of 2000-4000° C./second.

The process for producing synthesis gas for the FT synthesis according to the first aspect of the present invention, preferably further includes a trapping step of trapping soot in the synthesis gas for the Fischer-Tropsch synthesis, after the cooling step.

In addition, the process for producing synthesis gas for the FT synthesis according to the first aspect of the present invention, preferably includes a steam supplying step of supplying steam generated by heat which is recovered in the cooling step to the reaction step.

Moreover, in the process for producing synthesis gas for the FT synthesis in the above, a Space Velocity (SV) in the active carbon in the adsorbing step is preferably set to be 2000 to 3000 $Nm^3/hour/m^3$-CAT.

In addition, in the process for producing synthesis gas for the FT synthesis in the above, a Space Velocity (SV) in the hydrogenation catalyst in the hydro-desulfurizing step is preferably set to be 900 to 1500 $Nm^3/hour/m^3$-CAT, a Space Velocity (SV) in the adsorbing agent is preferably set to be 600 to 1100 $Nm^3/hour/m^3$-CAT, and a sulfur content in the outlet gas is preferably set to be 100 ppb or less.

Furthermore, in the process for producing synthesis gas for the FT synthesis in the above, in the reaction step, a temperature at the catalyst outlet is preferably set to be 850 to 900° C., a pressure at the catalyst outlet is preferably set to be 1.5 to 2.5 MPaG, a molar ratio ($H_2O/C$) of steam ($H_2O$) to carbon (C) of hydrocarbon in natural gas is preferably set to be 1.0 to 1.6 at the catalyst inlet, and a molar ratio ($CO_2/C$) of carbon dioxide ($CO_2$) to carbon (C) of hydrocarbon in natural gas is preferably set to be 0.4 to 0.6 at the catalyst inlet.

The second aspect of the present invention is a production apparatus of synthesis gas for the Fischer-Tropsch synthesis including: an active carbon adsorbing vessel containing active carbon for adsorbing and removing impurities in natural gas; a hydro-desulfurizer containing a hydrogenation catalyst for hydrogenating sulfur content in natural gas and adsorbing agent for adsorbing sulfur content in natural gas; a pressure controller for controlling a partial pressure of hydrogen in the hydro-desulfurizer to be 100 to 200 kPa; a hydrogen supplying device for supplying hydrogen to natural gas between the hydro-desulfurizer and a reactor; the reactor containing a catalyst for reforming which is for obtaining synthesis gas for the Fischer-Tropsch synthesis by reacting natural gas, carbon dioxide and steam; and a cooler for cooling the synthesis gas for the Fischer-Tropsch synthesis at a cooling rate of 2000 to 4000° C./second.

In addition, the producing apparatus of the synthesis gas for the Fischer-Tropsch synthesis according to the second aspect of the present invention preferably further includes a soot filter for trapping soot in the synthesis gas for the Fischer-Tropsch synthesis, downstream of the cooler.

Moreover, the producing apparatus of the synthesis gas for the Fischer-Tropsch synthesis in the above preferably further includes a steam drum for generating steam by heat recovered by the cooler.

Effects of Invention

According to the process for producing the synthesis gas for FT synthesis of the present invention and the producing apparatus, even when producing the synthesis gas for FT synthesis from a natural gas with a large scale production equipment (commercial plant), the synthesis gas for FT synthesis which has a hydrogen/carbon monoxide ratio suitable for FT synthesis (1.9-2.1), and no soot mixed therein can be obtained, and the side reaction in the hydro-desulfurizer and the deterioration of the catalyst for reforming can be suppressed.

DETAILED DESCRIPTION OF THE INVENTION

Hereafter, the present invention will be explained in detail.

Producing apparatus of the synthesis gas for FT synthesis

Figure 1:
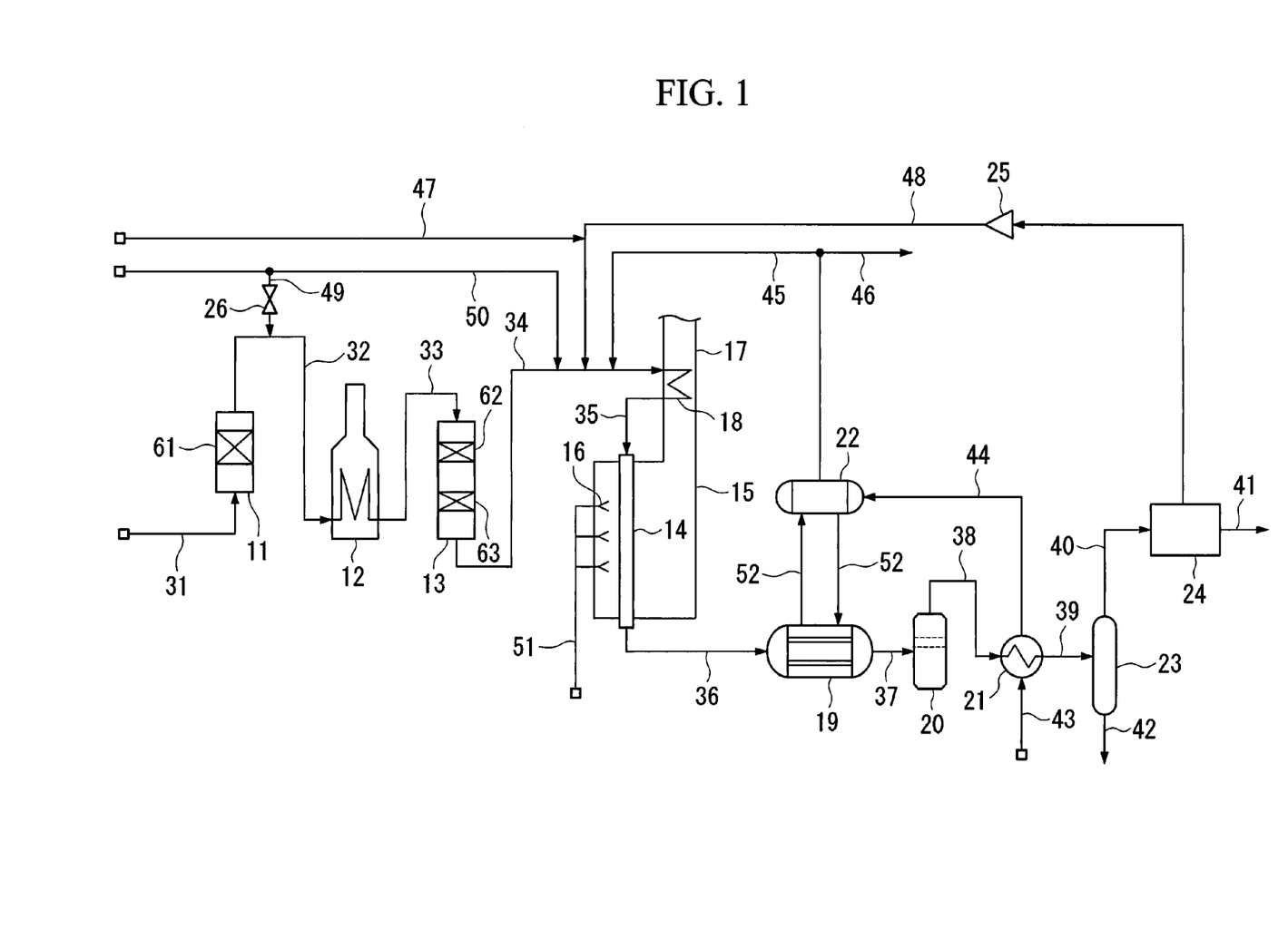
FIG. 1 is a schematic diagram showing an example of the producing apparatus of the synthesis gas for FT synthesis of the present invention.

FIG. 1 is a schematic diagram showing an example of the producing apparatus of the synthesis gas for FT synthesis. The producing apparatus of the synthesis gas for FT synthesis is constituted from an active carbon adsorbing vessel 11, a preheating furnace 12, a hydro-desulfurizer 13, a reactor 15 having catalyst tube 14 in which a catalyst for reforming is loaded, burners 16 disposed in the reactor 15, and a process feed preheating coil 18 disposed in an exhaust duct 17 of the reactor 15, a heat recovering boiler 19 (cooler), a soot filter 20, a BFW preheater 21, a steam drum 22, a separator 23, a carbon dioxide ($CO_2$) removal equipment 24, a compressor 25, and lines for connecting them.

Here, the lines are constituted from: a natural gas supplying line 31 for supplying a natural gas to the active carbon adsorbing vessel 11; the first natural gas transfer line 32 for transferring the natural gas from the active carbon adsorbing vessel 11 to the preheating furnace 12; the second natural gas transfer line 33 for transferring the natural gas from the preheating furnace 12 to the hydro-desulfurizer 13; the third natural gas transfer line 34 for transferring the natural gas from the hydro-desulfurizer 13 to the process feed preheater 18; the fourth natural gas transfer line 35 for transferring the natural gas from the process feed preheater 18 to the catalyst tube 14; the first synthesis gas transfer line 36 for transferring the synthesis gas from the catalyst tube 14 to the heat recovering boiler 19; the second synthesis gas transfer line 37 for transferring the synthesis gas from the heat recovering boiler 19 to the soot filter 20; the third synthesis gas transfer line 38 for transferring the synthesis gas from the soot filter 20 to the BFW preheater 21; the fourth synthesis gas transfer line 39 for transferring the synthesis gas from the BFW preheater 21 to the separator 23; the fifth synthesis gas transfer line 40 for transferring the synthesis gas from the separator 23 to the $CO_2$ removal equipment 24; a synthesis gas take-out line 41 for transferring the synthesis gas to FT synthesis process; a drain line 42 for draining water isolated by the separator; a feeding line 43 for supplying boiler feed water (BFW) to the BFW preheater 21; a water transfer line 44 for transferring the boiler feed water from the BFW preheater 21 to the steam drum 22; a steam supplying line 45 for supplying steam from the steam drum 22 to the third natural gas transfer line 34; a steam discharging line 46 for discharging an excess of steam; the first carbon dioxide supplying line 47 for supplying carbon dioxide to the third natural gas transfer line 34; the second carbon dioxide supplying line 48 for supplying carbon dioxide from the $CO_2$ removal equipment 24 to the third natural gas transfer line 34 by way of the compressor 25; the first hydrogen supplying line 49 for supplying hydrogen to the first natural gas transfer line 32; the second hydrogen supplying line 50 (hydrogen supplying device) for supplying hydrogen to the third natural gas transfer line 34; a fuel gas supplying line 51 for supplying fuel gas to burners 16; and BFW/steam lines 52 for supplying boiler feed water from the steam drum 22 to the heat recovering boiler 19, while evaporating a part of the boiler feed water at the heat recovering boiler 19 so as to obtain a steam at the steam drum 22. In addition, the first hydrogen supplying line 49 is equipped with a controller 29 such as a flow rate controlling valve.

Active Carbon Adsorbing Vessel

The active carbon adsorbing vessel 11 is constituted from a vessel and an active carbon layer 61 loaded therein.

Active carbon is used for the purpose of adsorbing and removing the impurities which may be contained in the natural gas of the raw material other than sulfur content, such as chlorine, arsenic, or mercury. As the active carbon, well-known active carbon, such as coconut husks active carbon, can be used.

Preheating Furnace

The preheating furnace 12 is one for heating the natural gas and hydrogen for hydrogenation to a temperature required for hydrogenation and desulfurization at the down-stream hydro-desulfurizer 13.

Hydro-desulfurizer

The hydro-desulfurizer 13 is one which contains a hydrogenation catalyst layer 62 and an adsorbing agent layer 63 therein. Here, the hydrogenation catalyst layer 62 is disposed to an upstream side, whereas the adsorbing agent layer 63 is disposed to a downstream side.

The hydrogenation catalyst is one for hydrogenating sulfur content in the natural gas. As the hydrogenation catalyst, a well-known one, such as a Ni—Mo type catalyst and a Co—Mo type catalyst, can be used, and the Ni—Mo type catalyst is particularly preferred.

The adsorbing agent is one for desulfurizing the sulfur content in the natural gas which is hydrogenated. As the adsorbing agent, a well-known one, such as a zinc oxide, iron oxide, or copper oxide, can be used, and the zinc oxide is particularly preferred.

Reactor

The reactor 15 is one which contains the catalyst tube 14, burners 16, and the process feed preheater 18, therein.

The catalyst tube 14 is loaded with a below-mentioned catalyst for reforming.

Within the catalyst tube 14, in the presence of the catalyst for reforming, a reforming reaction of the natural gas, carbon dioxide, and steam is performed to obtain the synthesis gas for the Fischer-Tropsch synthesis.

The burners 16 are one which burn fuel gas to heat the catalyst tube 14 to the temperature which is needed to conduct the reforming reaction. As the burners 16, a well-known type can be used. As the fuel gas, for example, the natural gas can be used.

The process feed preheater 18 is one which heats the mixed gas of the natural gas, carbon dioxide, and steam, using sensible heat of the exhaust gas which flows through the exhaust duct 17 of the reactor 15.

Catalyst for Reforming

As the catalyst for reforming, for example, the following catalysts may be exemplified: one which is constituted from a carrier which mainly consists of magnesium oxide, and active metal of rhodium and/or ruthenium supported thereon, and which has the specific surface area of not greater than 5 m$^2$/g, and a supported amount of the active metal being 0.10 to 5000 mass ppm to the carrier metal oxide based on the metal atom, which is disclosed in the patent document 1 (Japanese Unexamined Patent Application, First Publication No. 2000-104078); or one disclosed in the patent document 2 (Japanese Unexamined Patent Application, First Publication No. 2002-173303) which is constituted from a compound oxide having a composition described by the formula shown below, and at least one of M, Co, and Ni of which is highly dispersed in the compound oxide:

aM-bCo-cNi-dMg-eCa-fO (a, b, c, d, and e in the formula are molar fractions, respectively, and satisfy the following equations: $a+b+c+d+e=1, 0 \leq a \leq 0.1$, $0.001 \leq (b+c) \leq 0.3$, $0 \leq b \leq 0.3$, $0 \leq c \leq 0.3$, $0.6 \leq (d+e) \leq 0.999$, $0 < d \leq 0.999$, $0 \leq e \leq 0.999$ and f is a number of oxygen atoms which is required to maintain the electric charge balance. M denotes at least one selected from the group of element in the 6A group, the 7A group, transition element in the 8A group other than Co and/or Ni, element in the 1B group, the 2B group, the 4B group of the periodic table, and lanthanoid element.

Cooler

The heat recovering boiler 19 is one which flows a synthesis gas through a tube side, whereas which flows a boiler feed water through a shell side, such that the sensible heat of the synthesis gas discharged from the catalyst tube 14 of the reactor 15 is recovered as a steam by evaporating a part (10 to 20%) of the boiler feed water, thereby cooling the synthesis gas rapidly.

Although well-known heat recovering boilers (heat exchangers) can be used as the heat recovering boiler 19, in the present invention, it is important to use one which has the cooling rate of 2000 to 4000° C./second from the point of suppressing generating of soot. The reason why the cooling rate should be 2000 to 4000° C./second will be explained in detail in the explanation of the producing process later.

Soot Filter

The soot filter 20 is one which traps the soot (micro particles of carbon) which may be contained in the synthesis gas, and removes the soot from the synthesis gas. As the filter, any kind of filter may be used, as long as it can trap the soot; for example, a bag filter type one which consists of a ceramic element or sintered metal, a back wash type filter, a change-type filter, or the like can be used.

BFW Preheater

The BFW preheater 21 is one which heats the boiler feed water using the sensible heat of the synthesis gas discharged from the heat recovering boiler 19 and which cools the synthesis gas further at the same time. A well-known heat exchanger can be used as the BFW preheater 21.

Steam Drum

The steam drum 22 is one which isolates the steam generated at the heat recovering boiler 19 from the boiler feed water to generate the steam which will be a raw material of the synthesis gas. A well-known one can be used as the steam drum 22.

Separator

The separator 23 is one which condenses the unreacted steam contained in the synthesis gas to separate it from the synthesis gas as process condensate.

Carbon Dioxide Removal Equipment

The carbon dioxide removal equipment 24 is one which isolates and removes carbon dioxide contained in the synthesis gas from the synthesis gas.

Compressor

The compressor 25 is one which compresses carbon dioxide removed by the carbon dioxide removal equipment 24 so that it can be used again as carbon dioxide of a raw material.

Hydrogen Supplying Device

The second hydrogen supply line 50 is one which supplies hydrogen for suppressing oxidization of the catalyst for reforming located in the upper part of the catalyst tube 14 to the raw material gas which consists of the natural gas, carbon dioxide, and steam.

Hydrogen Partial Pressure Controller

The controller 26 is one which controls the supplying amount of the hydrogen which is supplied from the first hydrogen supply line 49 to the hydro-desulfurizer 13 by way of the first natural gas transfer line 32, such that the partial pressure of hydrogen at the hydro-desulfurizer 13 should be in a range of 100 to 200 kPa, such as flow controlling valve, or the like. In the present invention, in view of suppressing of the side reaction in the hydro-desulfurizer 13, it is important to control the partial pressure of hydrogen in the hydro-desulfurizer 13 to be within the range of 100 to 200 kPa. The reason why the partial pressure of hydrogen should be within the range of 100 to 200 kPa, will be explained in detail later in the explanation of the producing process.

Because the production apparatus of the synthesis gas for FT synthesis explained in the above is equipped with the hydro-desulfurizer 13 containing the hydrogenation catalyst layer 62 which hydrogenates sulfur content in the natural gas and the absorbing agent layer 63 which desulfurizes sulfur content in the natural gas therein, and the controller 26 which controls the partial pressure of hydrogen in the hydro-desulfurizer 13 to be within the range of 100 to 200 kPa, the sulfur content in the natural gas, which may be a cause of inactivation of the catalyst for reforming, can be reduced down to the necessary level.

In addition, because the production apparatus of the synthesis gas for FT synthesis is equipped with the heat recovering boiler 19 which cools the synthesis gas at the cooling rate of 2000 to 4000 degrees ° C./second, generating of soot can be suppressed.

Moreover, because the producing apparatus of the synthesis gas for FT synthesis is equipped with the second hydrogen supply line 50 (hydrogen supplying device) which supplies hydrogen to the natural gas between the hydro-desulfurizer 13 and the reactor 15, the activity deterioration due to oxidization of the catalyst for reforming (inlet side of the catalyst tube) can be suppressed.

Furthermore, because the producing apparatus of the synthesis gas for FT synthesis is equipped with the active carbon adsorbing vessel 11 which contains the active carbon which adsorbs and removes the impurities in the natural gas therein in addition to the hydro-desulfurizer 13, the catalyst poisoning of the catalyst for reforming can be prevented and the life of the catalyst for reforming can be elongated.

According to the producing apparatus of the synthesis gas for FT synthesis in the above, even when producing the synthesis gas for FT synthesis from the natural gas with a large scale production equipment, the synthesis gas for FT synthesis having hydrogen/carbon monoxide molar ratio suitable for FT synthesis, and no soot mixed therein can be obtained, and the occurrence of the side reaction in the hydro-desulfurizer and the activity deterioration of the catalyst for reforming can be suppressed.

Producing Process of the Synthesis Gas for FT Synthesis

Next, an example of the producing process of the synthesis gas for FT synthesis of the present invention using the producing apparatus of the synthesis gas for FT synthesis shown in FIG. 1 will be explained below.

Adsorbing Step

The natural gas supplied to the active carbon adsorbing vessel 11 by way of the natural gas supply line 31 passes the active carbon layer 61 of the active carbon adsorbing vessel 11. At this time, the impurities contained in the natural gas are adsorbed and removed from the natural gas by the active carbon.

The space speed (SV) of the natural gas in the active carbon layer 61 is preferably 2000 to 3000 $Nm^3/hour/m^3$-CAT. If the space speed (SV) in the active carbon layer 61 is less than 2000 $Nm^3/hour/m^3$-CAT, the equipment is excessive, and it becomes disadvantageous economically. Whereas if the space speed (SV) in the active carbon layer 61 is over 3000 $Nm^3/hour/m^3$-CAT, there is a possibility that impurities may leak to the downstream side in a short time.

The adsorbing step can be performed at a normal temperature.

Hydro-desulfurization Step

The natural gas which was transferred from the active carbon adsorbing vessel 11 to the preheating furnace 12 by way of the first natural gas transfer line 32 and the hydrogen which was supplied from the first hydrogen supply line 49 to this are heated at the preheating furnace 12 to the temperature which is required for performing hydrogenation and desulfurization in the hydro-desulfurizer 13 at a latter step, specifically 320 to 400° C.

Subsequently, the natural gas containing the hydrogen which was transferred from the preheating furnace 12 to the hydro-desulfurizer 13 by way of the second natural gas transfer line 33 passes the hydrogenation catalyst layer 62 in the hydro-desulfurizer 13 and then the adsorbing agent layer 63. At this time, the sulfur content in the natural gas is hydrogenated by the hydrogenation catalyst, and, subsequently is desulfurized by the adsorbing agent.

The partial pressure of hydrogen in the hydro-desulfurizer 13 is preferably within the range of 100 to 200 kPa. If the partial pressure of hydrogen in the hydro-desulfurizer 13 is less than 100 kPa, the hydrogenation of sulfur content cannot be fully performed, and as a result, it becomes difficult to decrease the concentration of the sulfur content to be not higher than 100 ppb of a target. On the other hand, if the partial pressure of hydrogen in the hydro-desulfurizer is higher than 200 kPa, methanation, i.e., conversion of carbon dioxide or carbon monoxide into methane, and side reaction, e.g., a hydrocracking of heavy hydrocarbons in the natural gas, such as ethane, propane, and the like, will be apt to occur, so that the operation temperature of the hydro-desulfurizer 13 increases rapidly out of control.

The space speed (SV) of the natural gas in the hydrogenation catalyst layer 62 is preferably within the range of 900 to 1500 $Nm^3/hour/m^3$-CAT. If the space speed (SV) in the hydrogenation catalyst layer 62 is less than 900 $Nm^3/hour/m^3$-CAT, the equipment is excessive, and it becomes disadvantageous economically. Whereas, if the space speed (SV) in the hydrogenation catalyst layer 62 is higher than 1500 $Nm^3/hour/m^3$-CAT, there is a possibility that a hydrogenation reaction may not advance to a required level.

The space speed (SV) of the natural gas in the adsorbing agent layer 63 is preferably within the range of 600 to 1100 $Nm^3/hour/m^3$-CAT. If the space speed (SV) in the adsorbing agent layer 63 is less than 600 $Nm^3/hour/m^3$-CAT, the equipment is excessive, and it becomes disadvantageous economically. Whereas if the space speed (SV) in the adsorbing agent layer 63 is higher than 1100 $Nm^3/hour/m^3$-CAT, there is a possibility that sulfur content (hydrogen sulfide) may leak to the downstream side in a short time.

The sulfur content in the outlet gas of the hydro-desulfurizer 13 is preferably not higher than 100 ppb, more preferably not higher than 50 ppb. When the sulfur content in the outlet gas is higher than 100 ppb, the catalyst for reforming may be poisoned and there is a possibility that the activity may deteriorate in a short time.

Hydrogen Supplying Step

The natural gas which was transferred from the hydro-desulfurizer 13 to the process feed preheater 18 by way of the third natural gas transfer line 34, the steam which was supplied to this natural gas from the steam drum 22 by way of the steam supply line 45, the carbon dioxide which was supplied from the first carbon dioxide supply line 47 (and the second carbon dioxide supply line 48), and the hydrogen which was supplied from the second hydrogen supply line 50 are heated by the process feed preheater 18 using the sensible heat of the exhaust gas out of the reactor 15 at a temperature, specifically 500 to 530° C.

The quantity of the hydrogen ($H_2$) supplied to a natural gas is preferably within the range of 0.05 to 0.1 mol to the (Carbon C) 1 mol of hydrocarbon in the natural gas. If the quantity of the hydrogen is less than 0.05 mol by 1 mol of the carbon (C) of the hydrocarbon in the natural gas, there is a possibility that the oxidization suppressing effect of the catalyst for reforming located at the upper part in the catalyst tube 14 may become insufficient. Whereas, if the quantity of the hydrogen is higher than 0.1 mol by 1 mol of the carbon (C) of the hydrocarbon in the natural gas, there is a possibility that hydrogen supply equipment will become excessive and will become disadvantageous economically.

Reaction Step

The raw material gas which is constituted from the natural gas which is transferred from the process feed preheater 18 to the catalyst tube 14 by way of the fourth natural gas transfer line 35, steam, and carbon dioxide reacts in the catalyst tube 14, in the presence of the catalyst for reforming to obtain synthesis gas for the Fischer-Tropshe syntheis. At this time, the hydrogen which is transferred to the catalyst tube 14 with the raw material gas suppresses the oxidization of the catalyst for reforming near the inlet of the catalyst tube 14 to maintain the activity of the catalyst for reforming. The oxidization of the catalyst for reforming near the outlet of the catalyst tube 14 is suppressed by hydrogen in the synthesis gas which is generated from the reaction.

In order to obtain efficiently and stably the synthesis gas for FT synthesis having the hydrogen/carbon monoxide molar ratio (1.9 to 2.1) which is suitable for FT synthesis, the temperature at the outlet of the catalyst tube 14 is preferably 850 to 900° C., the pressure at the outlet of the catalyst tube 14 is preferably 1.5 to 2.5 MPaG, the molar ratio ($H_2O/C$) of the steam to the carbon (C) of the hydrocarbon in the natural gas at the inlet of the catalyst tube 14 is preferably 1.0 to 1.6, and the molar ratio ($CO_2/C$) of the carbon dioxide to the carbon (C) of the hydrocarbon in the natural gas at the inlet of the catalyst tube 14 is preferably 0.4 to 0.6.

Cooling Step

The synthesis gas transferred from the catalyst tube 14 to the tube side of the heat recovering boiler 19 by way of the first synthesis gas transfer line 36 heats the boiler feed water at the shell side in the heat recovering boiler 19 to generate steam. Whereby the sensible heat of the synthesis gas is recovered as steam, and the synthesis gas is rapidly cooled simultaneously.

The cooling rate of the synthesis gas is important to be not less than 2000° C./second. The reason thereof will be explained below.

The conditions of the synthesis gas in the outlet of the catalyst tube 14 (for example, hydrogen/carbon monoxide molar ratio=2, temperature of 900° C., pressure of 1.9 MPaG) are conditions in which carbon tends to be generated in the cooling tube of the heat recovering boiler 19. Especially, what is important is the Boudouard's reaction shown in the following formula:

[chemical formula 1]

Figure 2:
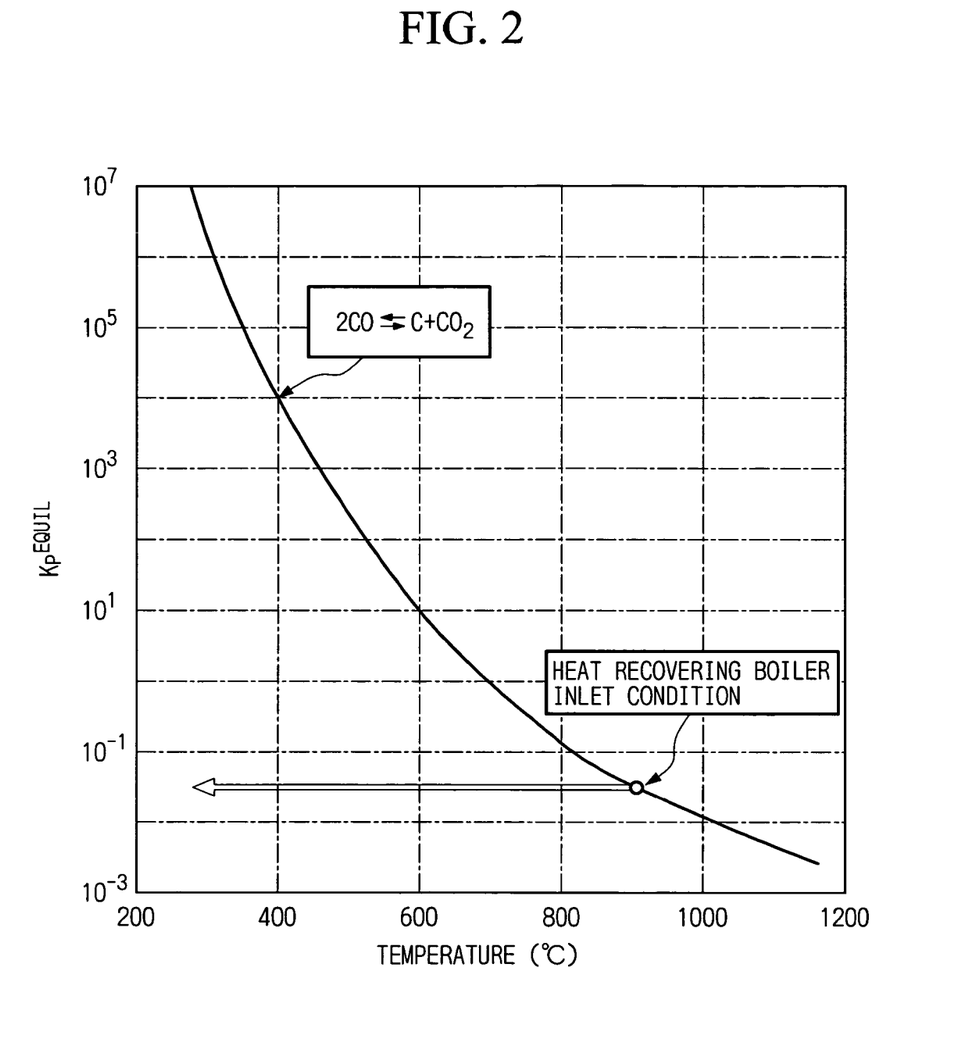
FIG. 2 is a graph showing the relation of the chemical equilibrium constant ($Kp^{EQUIL}$, vertical axis) and temperature (horizontal axis) in Boudouard's reaction.

The tendency in the occurrence of carbon generation is expressed by CA (carbon activity) of the following formula. $CA=Kp^{EQUIL}/Kp^{OPER}$ (in the formula, $Kp^{EQUIL}$ is a chemical equilibrium constant in operating temperature, and which is shown in FIG. 2.)

$Kp^{OPER}=P_{CO2}/(P_{CO})_2$ and $P_{CO2}$ and $P_{CO}$ show the partial pressure of the carbon dioxide and carbon monoxide under the operating condition.

If the CA is smaller than 1.0, carbon generating by the Boudouard's reaction will not take place thermodynamically. On the other hand, the more the CA becomes larger than 1.0, the more the potential of carbon generating increases. If the cooling conditions in the heat recovering boiler 19 are made to be 880° C. at the inlet, and 260° C. at the outlet, the CA within the cooling tube of the heat recovering boiler 19 will be those shown in Table 1, and the CA will increase rapidly toward the outlet of the heat recovering boiler 19.

TABLE 1

| | Temperature(° C.) | | | | | | |
|---|---|---|---|---|---|---|---|
| | 880 | 800 | 700 | 600 | 500 | 400 | 300 |
| CA | 0.8 | 3.8 | 12.5 | 23.8 | 175 | $2.5 \times 10^5$ | $3 \times 10^7$ |

Thus, it turns out that carbon generation tends to occur within the cooling tube of the heat recovering boiler 19. It should be noted that the reaction rate of the Boudouard's reaction becomes so low that the carbon generating becomes insignificant if the temperature is lower than 400° C. Therefore, in order to suppress the carbon generation, it is necessary for the synthesis gas to pass through the temperature area where both the CA and the reaction rate of the Boudouard's reaction are high, for a short residence time.

Therefore, in the present invention, because the cooling rate of the synthesis gas by the heat recovering boiler 19 is very high (not less than 2000° C./second), the synthesis gas can pass through the temperature region where the carbon tends to be generated in the cooling tube of the heat recovering boiler 19 in an extremely short time (for example, 0.15 to 0.3 seconds), and thereby the generating of soot can be suppressed.

Although it is preferred that the cooling rate be as high as possible, if the cooling rate of the synthesis gas of the heat recovering boiler is higher than 4000° C./second, the pressure loss in the cooling tube increases rapidly, and hence it is not realizable.

Trapping Step

The synthesis gas cooled by the heat recovering boiler 19 is transferred to the soot filter 20 by way of the second synthesis gas transfer line 37. When the synthesis gas passes through the soot filter 20, the soot in the synthesis gas is trapped by the filter.

It should be noted that since it is not a usual operating condition that the soot is contained in the synthesis gas obtained by performing the cooling step on the above-mentioned conditions, it is not necessary to perform the trapping step. However, since there is a possibility that the soot may be generated when the operation is started, when the operation is stopped, and when the operating condition is changed, it is preferred to perform the trapping step.

Steam Supply Step

The synthesis gas transferred to the BFW preheater 21 from the soot filter 20 by way of the third synthesis gas transfer line 38 heats the boiler feed water which is supplied to the BFW preheater 21 through the feed water line 43, and the synthesis gas is further cooled simultaneously.

The boiler feed water heated by the BFW preheater 21 is transferred to the steam drum 22 through the water transfer line 44, and is further supplied to the heat recovering boiler 19 to be vaporized to steam by the heat which is recovered from the synthesis gas. The steam passes through the steam supply line 45, and is supplied to the natural gas of the third natural gas transfer line 34.

Refining Step

The synthesis gas cooled by the BFW preheater 21 is transferred to the separator 23 by way of the fourth synthesis gas transfer line 39. In the separator 23, the unreacted steam contained in the synthesis gas is condensed, which is isolated from the synthesis gas as water, and the water is discharged from the drain line 42.

Subsequently, the synthesis gas is transferred to the carbon dioxide removal equipment 24 through the fifth synthesis gas transfer line 40. In the carbon dioxide removal equipment 24, the carbon dioxide contained in the synthesis gas is separated and removed from the synthesis gas, and is transferred to the compressor 25. The refined synthesis gas is taken out from the synthesis gas take-out line 41, and is transferred to the FT synthesis process. In the carbon dioxide removal equipment 24, a general amine adsorbing process is applied.

Because the producing process of the synthesis gas for FT synthesis explained in the above has the hydro-desulfurizing step in which the sulfur content in the natural gas is hydrogenated by the hydrogenation catalyst and is absorbed by the adsorbing agent under the condition of pressure 100 to 200 kPa, the sulfur content in the natural gas which may deactivate the catalyst for reforming can be reduced remarkably.

Moreover, because the producing process of the synthesis gas for FT synthesis has the cooling step which cools the synthesis gas at the cooling rate of 2000 to 4000° C./second, generating of soot can be suppressed efficiently.

In addition, because the producing process of the synthesis gas for FT synthesis has the hydrogen supply step which supplies 0.05 to 0.1 mol of hydrogen ($H_2$) to the natural gas after the hydro-desulfurizing step to the carbon (C) 1 mol of hydrocarbon in the natural gas, the activity deterioration by oxidization of the catalyst for reforming (inlet side of the catalyst pipe) can be suppressed.

Moreover, because the producing process of the synthesis gas for FT synthesis has the adsorbing step which adsorbs and removes the impurities in the natural gas by active carbon in addition to the hydro-desulfurizing step, the activity deterioration of the catalyst for reforming by impurities other than sulfur content can be prevented.

According to the producing process of the synthesis gas for FT synthesis, even when the gas for FT synthesis is produced from the natural gas with large scale production equipment, the synthesis gas for FT synthesis which has hydrogen/carbon monoxide molar ratio suitable for FT synthesis, and no soot mixed therein can be obtained, and the side reaction in the hydro-desulfurizer and the activity deterioration due to oxidization of the catalyst for reforming can be suppressed.

EXAMPLES

Working Examples of the present invention will be explained below.

Preparing of the Catalyst for Reforming 1.62 kg of nitric acid cobalt hexahydrate and 27.1 kg of nitric acid magnesium hexahydrate were dissolved in water in an amount of 50 L. Subsequently, while holding the temperature of the solution at 50° C., 2 mol/L of calcium carbonate solution in an amount of 59 L was added to the solution so as to make the pH of the solution 9, thereby depositing a precipitate which consists of two ingredients of magnesium and cobalt. The precipitate was filtered and washed. The precipitate was dried at 120° C. in the air for more than 12 hours. Subsequently, in the air, the precipitate was calcined at 450° C. for 4 hours, and the primary calcined product was obtained. The calcined product was molded, and thereafter the molded calcined product was further calcined at 1180° C. in the air for 5 hours to obtain the catalyst for reforming.

Natural Gas

As the natural gas used as a raw material, one having the following composition was used.

$CH_4$: 86.88-mol %, $C_2H_6$: 8.16 mol %, $C_3H_8$: 2.51 mol %, $C_4H_{10}$: 1.15 mol %, $C_5$ hydrocarbon+$C_6$ hydrocarbon: 0.12 mol %, $N_2$: 1.18 mol %, sulfur content: 300 ppb, and the other impurities are below the detection limits.

Working Example 1

As the production apparatus, one which is shown in FIG. 1 was used.

The catalyst for reforming in an amount of 114L was filled into a fixed bed type reaction tube having 110 mm inner diameter and an effective length of 12000 mm to form the catalyst tube 14. In the catalyst tube 14, hydrogen was beforehand flowed at the temperature of 800 to 900° C., thereby initially activating the catalyst.

The active carbon layer was filled with a 40 L of coconut husks active carbon. The hydrogenation catalyst layer 62 was filled with a 120 L of a Ni—Mo type catalyst. Moreover, the adsorbing agent layer 63 was filled with a 150 L of ZnO.

The amount of supply of the natural gas was set to be 112 $Nm^3$/hour (100% load), and the quantity of the hydrogen directly supplied to the natural gas between the hydro-desulfurizer 13 and the reactor 15 was set to be 0.05 mol-$H_2$/mol-C, and the synthesis gas was produced under the conditions shown in Table 2. The result is shown in Table 2.

The outlet temperature of the hydro-desulfurizer 13 is stabilized at 330° C., and it was ascertained that there is no change in the temperature by a side reaction (a methanation, hydrocracking, etc.), namely, no side reactions occurred.

The sulfur content of the outlet of the hydro-desulfurizer 13 was 2.1 ppb. The sum total of hydrogen and carbon monoxide in the synthesis gas was 406 $Nm^3$/hour, which was the quantity equivalent to FT synthesis oil of 13.7 Barrel/day. The hydrogen/carbon monoxide in the synthesis gas was 2.0, thus the synthesis gas suitable for FT synthesis was obtained.

Moreover, the outlet temperature of the heat recovering boiler 19 was stabilized at 259° C., and it was ascertained that there is no change of the temperature by carbon generating. In addition, the pressure loss in the soot filter 20 was also stable at 11 kPa, and it was ascertained that soot was not trapped by the filter. As mentioned above, it was ascertained that there was no generation of carbon.

Working Example 2

Using the same apparatus as in the Working Example 1, the amount of supply of the natural gas was set to be 101 $Nm^3$/hour (90% load), the amount of the hydrogen directly supplied to the natural gas between the hydro-desulfurizer 13 and the reactor 15 was set to 0.05 mol-$H_2$/mol-C, and the synthesis gas was produced under the conditions shown in Table 2. The result is shown in Table 2.

The outlet temperature of the hydro-desulfurizer 13 was stabilized at 329° C., and it was ascertained that no side reactions occurred. The sulfur content of the outlet of the hydro-desulfurizer 13 was 2.1 ppb. The sum total of hydrogen and carbon monoxide in the synthesis gas was 391 $Nm^3$/hour, which was the quantity equivalent to FT synthesis oil of 13.0 Barrel/day. The hydrogen/carbon monoxide molar ratio in the synthesis gas was 2.0, thus the synthesis gas suitable for FT synthesis was obtained.

Moreover, the outlet temperature of the heat recovering boiler 19 was stabilized at 264° C., and it was ascertained that there is no change of the temperature by carbon generating. In addition, the pressure loss in the soot filter 20 was also stabilized to be 10 kPa, and it was ascertained that soot was not trapped by the filter. As mentioned above, it was ascertained that there was no generation of carbon.

Working Example 3

Using the same apparatus as in the Working Example 1, the amount of supply of the natural gas was set to be 79 $Nm^3$/hour (70% load), the amount of the hydrogen directly supplied to the natural gas between the hydro-desulfurizer 13 and the reactor 15 was set to be 0.05 mol-$H_2$/mol-C, and the synthesis gas was produced under the conditions shown in Table 2. The result is shown in Table 2.

The outlet temperature of the hydro-desulfurizer 13 was stabilized at 322° C., and it was ascertained that no side reactions occurred. The sulfur content of the outlet of the hydro-desulfurizer 13 was 3.0 ppb. The sum total of hydrogen and carbon monoxide in the synthesis gas was 334 $Nm^3$/hour, which was the quantity equivalent to FT synthesis oil of 11.2 Barrel/day. The hydrogen/carbon monoxide molar ratio in the synthesis gas was 2.0, thus the synthesis gas suitable for FT synthesis was obtained.

Moreover, the outlet temperature of the heat recovering boiler 19 was stabilized at 256° C., and it was ascertained that there is no change of the temperature by carbon generating. In addition, the pressure loss in the soot filter 20 was also stabilized to be 9 kPa, and it was ascertained that soot is not trapped by the filter. As mentioned above, it was ascertained that there was no generation of carbon.

Accordingly the invention is not to be considered as being limited by the foregoing description, and is only limited by the scope of the appended claims.

What is claimed is:

1. A process for producing synthesis gas for the Fischer-Tropsch synthesis comprising:

TABLE 2

| | | Working Example | | |
|---|---|---|---|---|
| | | 1 | 2 | 3 |
| Reactor | $H_2O/C$ [molar ratio] | 1.15 | 1.39 | 1.61 |
| | $CO_2/C$ [molar ratio] | 0.41 | 0.51 | 0.59 |
| | $H_2/CO$ [molar ratio] | 2.0 | 2.0 | 2.0 |
| | hydrogen supply [mol-$H_2$/mol-C] | 0.05 | 0.05 | 0.05 |
| | catalyst tube inlet flow rate [$Nm^3$/hour] | 346 | 353 | 304 |
| | temperature[° C.] | 493 | 494 | 497 |
| | pressure[kPaG] | 2,109 | 2,093 | 1,762 |
| | catalyst tube outlet flow rate [$Nm^3$/hour] | 550 | 549 | 472 |
| | temperature[° C.] | 894 | 894 | 899 |
| | pressure[kPaG] | 1,871 | 1,843 | 1,535 |
| Hydro-desulfurizer | flow rate [$Nm^3$/hour] | 125 | 113 | 90 |
| | temperature(inlet/outlet) [° C.] | 345/330 | 347/329 | 346/322 |
| | pressure [kPaG] | 2,134 | 2,120 | 1,785 |
| | SV(hydrogenation catalyst) [$Nm^3$/hour/$m^3$] | 1,042 | 941 | 749 |
| | SV(absorbent) [$Nm^3$/hour/$m^3$] | 862 | 778 | 620 |
| | hydrogen partial pressure [kPa] | 134 | 136 | 133 |
| | outlet sulfur concentration [ppb] | 2.1 | 2.1 | 3.0 |
| Heat recovering boiler | inlet temperature [° C.] | 876 | 873 | 867 |
| | outlet temperature [° C.] | 259 | 264 | 256 |
| | cooling rate [° C./sec.] | 2,700 | 2,730 | 2,720 |
| Soot filter pressure loss [kPa] | | 11 | 10 | 9 |
| Soot generation | | 0 | 0 | 0 |
| Synthesis gas | flow rate [$Nm^3$/hour] | 471 | 453 | 381 |
| | temperature [° C.] | 23 | 23 | 23 |
| | pressure [kPaG] | 1,770 | 1,770 | 1,470 |
| | composition [mol %] | | | |
| | $H_2$ | 57.5 | 57.7 | 58.5 |
| | CO | 28.6 | 28.7 | 29.2 |
| | $CO_2$ | 6.3 | 8.0 | 8.8 |
| | $CH_4$ | 7.1 | 5.2 | 3.0 |
| FT synthesis oil production [Barrel/day] | | 13.7 | 13.0 | 11.2 |

INDUSTRIAL APPLICABILITY

According to the producing process of the synthesis gas for FT synthesis and the producing apparatus of the synthesis gas for FT synthesis of the present invention, the synthesis gas for FT synthesis which has the hydrogen/carbon monoxide molar ratio suitable for FT synthesis (1.9-2.1), and no soot mixed therein can be obtained from the natural gas, and the side reaction in a hydro-desulfurizer and the activity deterioration due to oxidization of the catalyst for reforming can be suppressed. Therefore, the present invention is very effective in the design of large scale production equipment (commercial plant) for producing the synthesis gas for FT synthesis from the natural gas, in which the generating of soot, the activity deterioration due to oxidization of the catalyst for reforming, and the side reaction in the hydro-desulfurizer likely become a problem.

While preferred embodiments of the invention have been described and illustrated above, it should be understood that these are exemplary of the invention and are not to be considered as limiting. Additions, omissions, substitutions, and other modifications can be made without departing from the spirit or scope of the present invention.

an adsorbing step of adsorbing impurities contained in natural gas by active carbon to remove the impurities therefrom;

a hydro-desulfurizing step of hydrogenating sulfur content in the natural gas in the presence of a hydrogenation catalyst under a partial pressure of hydrogen of 100 to 200 kPa and desulfurizing the sulfur content by an adsorbing agent;

a hydrogen supplying step of supplying the natural gas after the hydro-desulfurizing step with hydrogen ($H_2$) in an amount of 0.05 to 0.1 mol to 1 mol of carbon (C) of hydrocarbon in the natural gas;

a reaction step of reacting the natural gas, carbon dioxide, and steam in the presence of a catalyst for reforming to obtain synthesis gas for the Fischer-Tropsch synthesis; and a cooling step of cooling the synthesis gas for the Fischer-Tropsch synthesis at a cooling rate of 2000-4000° C./second.

2. A process for producing synthesis gas for the Fischer-Tropsch synthesis as set forth in claim 1, further comprising a trapping step of trapping soot in the synthesis gas for the Fischer-Tropsch synthesis, after the cooling step.

3. A process for producing synthesis gas for the Fischer-Tropsch synthesis as set forth in claim 1, further comprising a steam supplying step of supplying steam generated by heat which is recovered in the cooling step to the reaction step.

4. A process for producing synthesis gas for the Fischer-Tropsch synthesis as set forth in claim 1, wherein a Space Velocity (SV) in the active carbon in the adsorbing step is set to be 2000 to 3000 $Nm^3$/hour/$m^3$-CAT.

5. A process for producing synthesis gas for the Fischer-Tropsch synthesis as set forth in claim 1, wherein a Space Velocity (SV) in the hydrogenation catalyst in the hydrodesulfurizing step is set to be 900 to 1500 $Nm^3$/hour/$m^3$-CAT, a Space Velocity (SV) in the adsorbing agent is set to be 600 to 1100 $Nm^3$/hour/$m^3$-CAT, and a sulfur content in the outlet gas is set to be 100 ppb or less.

6. A process for producing synthesis gas for the Fischer-Tropsch synthesis as set forth in claim 1, wherein, in the reaction step, a temperature at the catalyst outlet is set to be 850 to 900° C., a pressure at the catalyst outlet is set to be 1.5 to 2.5 MPaG, a molar ratio ($H_2O$/C) of steam ($H_2O$) to carbon (C) of hydrocarbon in natural gas is set to be 1.0 to 1.6 at the catalyst inlet, and a molar ratio ($CO_2$/C) of carbon dioxide ($CO_2$) to carbon (C) Of hydrocarbon in natural gas is set to be 0.4 to 0.6 at the catalyst inlet.

* * * * *

UNITED STATES PATENT AND TRADEMARK OFFICE
CERTIFICATE OF CORRECTION

PATENT NO. : 7,393,470 B2  
APPLICATION NO. : 11/090393  
DATED : July 1, 2008  
INVENTOR(S) : Masaru Ihara et al.

Page 1 of 1

It is certified that error appears in the above-identified patent and that said Letters Patent is hereby corrected as shown below:

Title Pg, Item (75), Inventors: "Yoshifumi Suehiro, Horie Urayasu" should be
-- Yoshifumi Suehiro, Urayasu --.

Title Pg, Item (73), Assignee: "Sekiyushigen Kamatsu Kabushiki Kaisha" should be
-- Sekiyushigen Kaihatsu Kabushiki Kaisha --.

Signed and Sealed this

Fourteenth Day of October, 2008

JON W. DUDAS  
*Director of the United States Patent and Trademark Office*